United States Patent
Phan Huy et al.

(10) Patent No.: US 10,098,015 B2
(45) Date of Patent: Oct. 9, 2018

(54) METHOD OF COMMUNICATION IN A CO-OPERATIVE NETWORK

(75) Inventors: Dinh Thuy Phan Huy, Paris (FR); Rodolphe Legouable, Cesson-Sevigne (FR)

(73) Assignee: Orange, Paris (FR)

( * ) Notice: Subject to any disclaimer, the term of this patent is extended or adjusted under 35 U.S.C. 154(b) by 218 days.

(21) Appl. No.: 13/885,726

(22) PCT Filed: Nov. 15, 2011

(86) PCT No.: PCT/FR2011/052644
§ 371 (c)(1),
(2), (4) Date: May 16, 2013

(87) PCT Pub. No.: WO2012/066227
PCT Pub. Date: May 24, 2012

(65) Prior Publication Data
US 2013/0336139 A1 Dec. 19, 2013

(30) Foreign Application Priority Data

Nov. 19, 2010 (FR) ..................... 10 59520

(51) Int. Cl.
H04W 24/02 (2009.01)
H04L 25/02 (2006.01)
H04B 7/22 (2006.01)
H04L 25/03 (2006.01)

(52) U.S. Cl.
CPC ....... *H04W 24/02* (2013.01); *H04L 25/03343* (2013.01); *H04L 25/0226* (2013.01)

(58) Field of Classification Search
CPC .... H04W 56/005; H04B 7/005; H04B 7/0626
See application file for complete search history.

(56) References Cited

U.S. PATENT DOCUMENTS

| | | | |
|---|---|---|---|
| 2004/0131007 A1* | 7/2004 | Smee et al. | 370/208 |
| 2004/0131029 A1* | 7/2004 | Tobe | H04M 15/8016 370/331 |
| 2006/0223587 A1* | 10/2006 | Fernandez-Corbaton | H01Q 25/00 455/562.1 |
| 2007/0076664 A1* | 4/2007 | An | H04W 80/10 370/331 |
| 2008/0255761 A1* | 10/2008 | Wang | G01V 1/28 702/17 |
| 2010/0111065 A1* | 5/2010 | Noh et al. | 370/342 |

(Continued)

OTHER PUBLICATIONS

P. Bisaglia, L. Sanguinetti, M. Morelli, N. Benvenuto and S. Pupolin, Pre-equalization Techniques for Downlink and Uplink TDD MC-CDMA Systems, Wireless and Personal Communications, vol. 35, pp. 3-18, 2005.*

(Continued)

*Primary Examiner* — Christopher Crutchfield
(74) *Attorney, Agent, or Firm* — Drinker Biddle & Reath LLP

(57) ABSTRACT

A communications method executed by a node of a telecommunications network, the method includes: a training step including determining a "transmission" filter as a function of a received training signal; and a data transmission step of transmitting data to a target node of the network while using the transmission filter as determined during the training step.

13 Claims, 5 Drawing Sheets

(56) References Cited

U.S. PATENT DOCUMENTS

2010/0296463 A1\* 11/2010 Taoka et al. ............... 370/329
2012/0015937 A1\* 1/2012 Ding et al. ................. 514/218
2012/0113942 A1\* 5/2012 Kim .......................... 370/329

OTHER PUBLICATIONS

W. Siriwongpairat, T. Himsoon, W. Su, K. Liu, Optimum Threshold-Selection Relaying for Decode-and-Forward Cooperation Protocol, Proceedings of the WCNC 2006, pp. 1015-1020.\*

Barton et al., "Cooperative Time-Reversal Communication in Wireless Sensor Networks," 2005 IEEE/SP 13th Workshop on Statistical Signal Processing, Bordeaux, France, Jul. 17-20, 2005, Piscataway, NJ USA, IEEE, pp. 1146-1151 (Jul. 17, 2005).

Barton et al., "Order-Optimal Data Aggregation in Wireless Sensor Networks Using Cooperative Time-Reversal Communications," 2006 40th Annual Conference on Information Sciences and Systems, IEEE, PI, pp. 1050-1055 (Mar. 1, 2006).

Jose et al., "Channel Estimation and Linear Precoding in Multiuser Multiple-Antenna TDD Systems," IEEE Transactions on Vehicular Technology, Jun. 27, 2011, vol. 60 (5), pp. 2102-2116.

\* cited by examiner

METHOD OF COMMUNICATION IN A CO-OPERATIVE NETWORK

CROSS-REFERENCE TO RELATED APPLICATIONS

This application is the U.S. national phase of the International Patent Application No. PCT/FR2011/052644 filed Nov. 15, 2011, which claims the benefit of French Application No. 1059520 filed Nov. 19, 2010, the entire content of which is incorporated herein by reference.

BACKGROUND OF THE INVENTION

The invention relates to the general field of telecommunications. The invention relates in particular to a co-operative radio network.

In a co-operative radio network, a plurality of access points co-operate to transmit data simultaneously to a target over a wireless connection. The techniques used, known as co-operative beamforming, enable the signal to interference-and-noise ratio (SINR) to be increased at the target, and thus make it possible to increase the transmission data rate.

Typically, data transmission comprises a plurality of stages:
- a relay stage in which source access points having data for transmission to the target transmit the data to other access points of the network, with the data being stored therein;
- a training stage, in which the target transmits a training sequence; each access point estimates the impulse response of the channel between the target and itself from the sequence it has received as deformed by the channel, and then each access point determines a pre-equalization filter as a function of the estimated impulse response (e.g. the pre-equalization filter may be the time-reversed impulse response); and
- a transmission stage, in which each access point finally retransmits the data while pre-equalizing it with its own filter as determined during the training stage, and in such a manner that the transmissions take place simultaneously and synchronously.

The advantage of such a technique is that it makes it possible to take advantage of the transmission power of a plurality of access points instead of only one. Let Pmax be the maximum transmission power of an access point. Simultaneous transmission from N access points makes it possible to increase the transmission power by a factor of N compared with Pmax, and in association with the pre-equalization filters, that makes it possible to increase the power received by the target and to increase the SINR. The document entitled "Co-operative time-reversal communication in wireless sensor networks", by R. J. Barton, Ji Chen, Kyle Huant, Dagang Wu, published in Statistical Signal Processing, 2005 IEEE/SP 13$^{th}$ Workshop on Digital Object, pp. 1146 to 1151 (published in 2005), describes an example of communication in a co-operative network of that type.

The SINR at the target, and thus also the transmission data rate, increase with increasing number of co-operating access points. Nevertheless, the number of co-operating access points is limited by the transmission power of the target Ptarget. Only access points within range of the target can perform the training stage. Unfortunately, the range of the target is limited by its transmission power Ptarget.

SUMMARY

The invention proposes a communications method executed by a node of a telecommunications network, the method comprising:

- a training step including determining a "transmission" filter as a function of a received training signal; and
- a data transmission step of transmitting data to a target node of the network while using said transmission filter as determined during the training step.

The training step comprises:
- a listening step of listening to a first training signal coming from the target node of the network;
- a verification step of verifying correct reception of the first training signal; and
- in response to correct reception of the first training signal:
  - a step of determining the transmission filter as a function of at least the first training signal; and
  - a step of transmitting a second training signal pre-equalized by a "focusing" pre-equalization filter that is determined as a function of the first training signal; or
- in the absence of correct reception of the first training signal, a step of listening for a second training signal, and in response to correctly receiving said second training signal, a step of determining the transmission filter as a function at least of the second training signal.

Correspondingly, the invention proposes a communications node for a telecommunications network, the node comprising:
- training means suitable for determining a "transmission" filter as a function of a received training signal; and
- data transmission means for transmitting data to a target node of the network, while using said transmission filter determined by the training means.

The training means comprise:
- means for listening to a first training signal coming from the target node of the network;
- means for verifying that the first training signal has been received correctly;
- means for determining the transmission filter as a function at least of the first training signal, and means for transmitting a second training signal pre-equalized by a "focusing" pre-equalizing filter as determined as a function of the first training signal and activated in response to correctly receiving the first training signal; and
- means for listening to a second training signal and means for determining the transmission filter as a function at least of the second training signal, which means are activated in the absence of the first training signal being received correctly and in response to said second training signal being received correctly.

In corresponding manner, the invention provides a telecommunications network comprising a target entity and a plurality of communications nodes in accordance with the invention, wherein the data transmission means of the communications nodes are suitable for transmitting data to the target node in simultaneous and synchronous manner.

By means of these characteristics, the target entity can receive data coming not only from nodes within its range and that have received the first training signal, but also from nodes that are not within its range but that have received the second training signal. The number of nodes that co-operate for transmitting data is thus higher. Thus, the power and the SINR of the signal received by the target entity are higher, thereby enabling transmission to take place at a faster data rate.

In response to correct reception of the first training signal, the communications method may comprise a step of sending an information message to a management entity.

Thus, the management entity knows which nodes have correctly received the first training signal. In a variant, the management entity uses this information to give instructions to transmit the second training signal. In general, the management entity can use this information to give instructions to transmit data to the target node.

In a variant in which the management entity uses this information to give instructions to transmit the second training signal, the information message gives an estimate of a power that can be achieved at the target node, the step of sending a second training signal being performed in response to receiving an instruction message from the management entity.

Correspondingly, in an embodiment, the telecommunications network comprises a management entity, and the communications nodes comprise:
  power estimation means for estimating a power that can be achieved at the target entity, and message sender means for sending a message containing said power to the management entity and activated in response to correctly receiving the first training signal; and
  means for transmitting a second training signal and activated in response to receiving an instruction message from the management entity;
  the management entity comprising:
  receiver means for receiving said messages containing the powers that can be achieved at the target entity as transmitted by a group of communications nodes that have correctly received the first training signal;
  test means for testing an enlargement condition as a function of said powers; and
  sender means for sending instruction messages to the communications nodes of said group and activated when said enlargement condition is true.

In corresponding manner, the invention provides a management entity for a telecommunications network. The management entity comprises:
  receiver means for receiving messages containing powers that can be achieved at the target entity, which messages are transmitted by a group of communications nodes that have correctly received a first training signal;
  test means for testing an enlargement condition as a function of said powers; and
  sender means for sending instruction messages to the communications nodes of said group, which means are activated when said enlargement condition is true.

Correspondingly, the invention provides a management method to be performed by a management entity of a telecommunications network. The method comprises:
  a step of receiving messages containing powers that can be transmitted at a target entity as transmitted by a group of communications nodes that have correctly received a first training signal;
  a step of testing an enlargement condition as a function of said powers; and
  when said enlargement condition is true, a step of sending instruction messages to the communications nodes of said group.

Thus, if it is not possible to reach additional nodes other than those in range of the target entity, e.g. because of a particular arrangement of the nodes, the enlargement condition test makes it possible to save the energy that would otherwise be needed for transmitting the second training signal.

In an embodiment, in the telecommunications network:
  the communications nodes include transmitter means for transmitting a second training signal, which means are activated in response to correctly receiving the first training signal; and
  the target entity includes transmitter means for transmitting a second training signal suitable for sending said second training signal in simultaneous and synchronous manner to the communications nodes.

Correspondingly, the invention provides a target entity for a telecommunications network, the target entity comprising:
  transmitter means for transmitting a first training signal to communications nodes; and
  receiver means for receiving data transmitted by a group of communications nodes.

The target entity further comprises:
  transmitter means for transmitting a second training signal and suitable for sending said second training signal in simultaneous and synchronous manner to a group of communications nodes.

In corresponding manner, the invention provides a communications method performed by a target entity of a telecommunications network and comprising:
  a step of transmitting a first training signal to communications nodes; and
  a reception step of receiving data transmitted by a group of communications nodes.

The method further comprises:
  a transmission step of transmitting a second training signal in simultaneous and synchronous manner to a group of communications nodes.

Under such circumstances, the target entity and the nodes within range co-operate for transmitting the second training signal. The range of the second training signal is thus necessarily greater than the range of the target entity alone. It is therefore normally possible to reach additional nodes, and thus to improve the transmission data rate.

In an embodiment, the telecommunications network further comprises at least one terminal, and:
  the communications nodes include transmitter means for transmitting an intermediate training signal, which means are activated in response to correctly receiving the first training signal; and
  the terminal includes listener means for listening to the intermediate training signal and transmitter means for transmitting a second training signal.

Correspondingly, the invention provides a terminal for a telecommunications network, the terminal comprising listener means for listening to an intermediate training signal and transmitter means for transmitting a second training signal.

Under such circumstances, the second training signal is not transmitted between the various nodes performing the training stage. It is therefore not necessary to use a frame format that includes a stage for communication between nodes. On the contrary, it is possible to use a frame format that is conventional for transmission of the time division duplexing (TDD) type. Such a frame comprises an up transmission stage (from the target entity to the nodes) and a down transmission stage (from the nodes to the target entity), but does not have a stage for transmission between nodes.

The invention also provides a computer program including instructions for executing steps of a communications method in accordance with the invention when said program is executed by a computer. Likewise, the invention provides a computer program including instructions for executing steps of management method in accordance with the invention when said program is executed by a computer.

Each of these programs may use any programming language, and may be in the form of source code, object code, or code intermediate between source code and object code, such as in a partially compiled form, or in any other desirable form.

The invention also provides a computer readable recording medium or data medium that includes instructions of a computer program as mentioned above.

The above-mentioned recording medium may be any entity or device capable of storing the program. For example, the medium may comprise storage means such as a read only memory (ROM), e.g. a compact disk (CD) ROM, or a microelectronic circuit ROM, or indeed magnetic recording means, such as a floppy disk or a hard disk.

Furthermore, the recording medium may correspond to a transmissible medium such as an electrical or optical signal, which may be conveyed via an electrical or optical cable, by radio, or by other means. The program of the invention may in particular be downloaded from an Internet type network.

Alternatively, the recording medium may correspond to an integrated circuit in which the program is incorporated, the circuit being adapted to execute or to be used in the execution of the method in question.

BRIEF DESCRIPTION OF THE DRAWINGS

Other characteristics and advantages of the present invention appear from the following description given with reference to the accompanying drawings and showing an implementation having no limiting character. In the figures.

DETAILED DESCRIPTION

The invention is described below in the context of a co-operative network made up of nodes and a target entity, in which the nodes are capable of co-operating for transmitting data towards the target entity. By way of example, it may be a network having mobile or fixed access, in which the nodes are access points and the target is a piece of telecommunications equipment, or a network of sensors in which the nodes are sensors and the target entity collects the data coming from the sensors.

Figure 1:
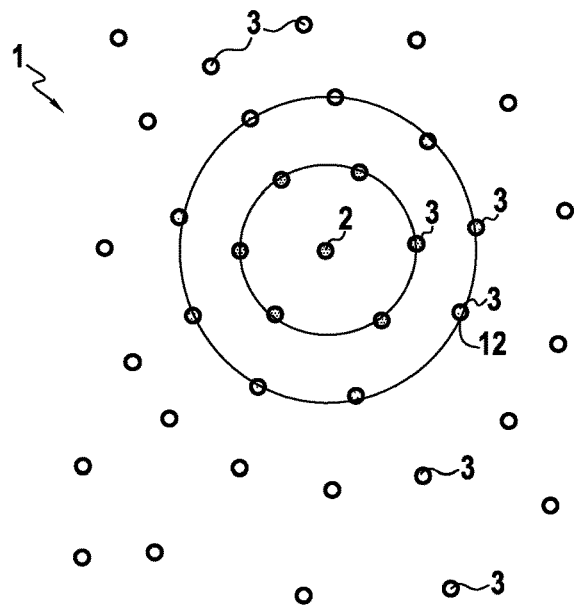
FIG. 1 is a diagrammatic view of a network in an implementation of the invention.

FIG. 1 shows a co-operative network 1 including a target entity 2 and nodes 3. For reasons of clarity, the reference 3 is not marked on each of the nodes in FIG. 1. The nodes 3 and the target entity 2 are synchronized, i.e. they share common knowledge about time T.

Figure 2:
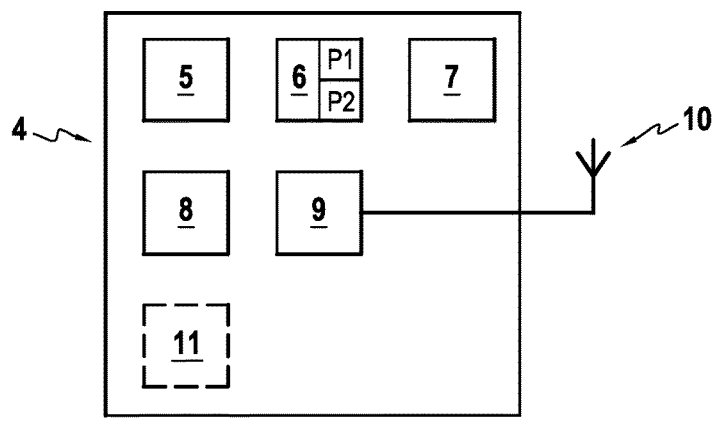
FIG. 2 shows a communications device of the FIG. 1 network.

FIG. 2 shows a communications device 4 that may be the target entity 2 or one of the nodes 3. The communications device 4 presents the hardware architecture of a computer and comprises a processor 5, a ROM 6, a random access memory (RAM) 7, possibly non-volatile memory 8, a communications interface 9, and an antenna 10.

The processor 5 serves to execute computer programs stored in the ROM 6, making use of the RAM 7. The RAM 7 and the non-volatile memory 8 enable data to be stored.

The communications interface 9 and the antenna 10 enable wireless communication to be performed in the network 1. In addition, for a node 3, the communications device 4 has an interface 11 that enables wireless communication to be undertaken with the other nodes 3 of the network 1.

In the network 1 of FIG. 1, a plurality of nodes 3 can co-operate to transmit data to the target entity 2 via a wireless connection. For this purpose, each node 3 performs a communications method that is described below. The communications method is performed by executing a computer program P1 stored in the ROM 6, and comprising instructions for performing the communications method.

In addition, a piece of network equipment, referred to as a "management entity" 12 performs a method of managing data transmission, as described below. In the example of FIG. 1, the management entity 12 is one of the nodes 3. The management method is performed by executing a computer program P2 stored in the ROM 6 of at least one node 3 and comprising instructions for performing the management method. In a variant, the management entity 12 is a communications device that is distinct from the nodes 3. Below, when reference is made to communication between the management entity 12 and a node 3, that might involve telecommunication over a wired connection between the management entity 12 and a node 3 that is distinct therefrom, or internal communication within a node 3 that also performs the role of a management entity 12.

Figure 3:
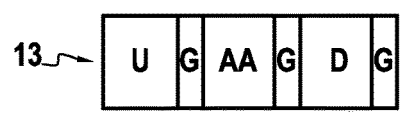
FIG. 3 shows a frame format used by the nodes of the FIG. 1 network.

FIG. 3 shows the format of a frame 13 used for communicating in the network 1 over a wireless connection. Transmission in the network 1 is transmission of the TDD type. Thus, the frame 13 comprises an up transmission stage U (from the target entity 2 to the nodes 3) and a down transmission stage D (from the nodes 3 to the target entity 2). The frame 13 also includes an internode transmission stage AA between nodes 3. The stages U, AA, and D are separated by guard times G.

The above-mentioned communications method and management method are described below with reference to FIG. 4. Each node 3 executes the same program P1. Nevertheless, as a function of the signals received, the nodes 3 behave differently from one another. Thus, in FIG. 4, there are shown a node 3A close to the target entity 2, a node 3B situated at an intermediate distance from the target entity 2, and a node 3C that is remote from the target entity 2. The indices i and j are used below to designate a particular one of the nodes 3, i.e. 3A, 3B, or 3C. In FIG. 1, two circles centered on the target entity 2 show the positions of the nodes 3A and 3B.

In step 20, the management entity 12 defines a group Gmax of nodes 3 and informs the nodes 3 that they are included in Gmax by means of messages M1. The messages M1 are transmitted by wired connections by the interfaces (and possibly internally within the node 3$i$ that acts as the management entity 12). The management entity 12 also initializes groups G1, G2, and Gf with empty sets. The group G1 is to include the nodes 3 that are close to the target entity 2, the group G2 is to include the nodes 3 that are at an intermediate distance from the target entity 2, and the group Gf is to include the nodes 3 of both G1 and G2.

Thereafter, in step 21, the target entity 2 transmits a training signal SA1 over a wireless connection, which training signal SA1 includes a training sequence that is also referenced SA1. Simultaneously, each node 3$i$ of the group Gmax listens to the training signal SA1 during a step 22. The transmission of the training signal SA1 corresponds to the stage U of the frame 13.

Thereafter, in a step 23, each node 3$i$ of the group Gmax verifies whether it has received the training signal SA1 correctly. For example, each node 3$i$ determines the SINR of the received signal and compares it with a predetermined reception threshold S.

The maximum transmission power from the target entity 2, written PC, puts a limit on the range of the target entity 2. As a result, only the nodes 3A that are situated close to the target entity 2 receive the training sequence SA1 correctly and perform a step 24 that is described below. The nodes 3B and 3C that are further away do not receive the training sequence SA1 correctly. After the step 23, they therefore do not perform the step 24 and they wait before performing a step 30 that is described below.

In step 24, each node 3A$i$ estimates the impulse response Hi(t) of the transmission channel between the target entity 2 and itself as a function of the training sequence SA1 as received after being deformed by the channel. Each node 3A$i$ calculates a pre-equalization filter, referred to as a "focusing" filter Fi(t) as a function of its impulse response Hi(t). The person skilled in the art knows methods for determining the impulse response Hi(t) and the focusing filter Fi(t). By way of example, the focusing filter Fi(t) is given by time reversal of the impulse response Hi(t): Fi(t) =Hi(−t)*.

The node 3A$i$ also estimates the power Pci that it estimates it is capable of delivering to the focus of the target entity 2 as a function of the impulse response Hi(t). Finally, the node 3A$i$ sends a message M2 to the management entity 12 in order to indicate that it has received the training sequence SA1 correctly and in order to inform the management entity 12 about the power Pci.

In response to receiving messages M2 from each of the nodes 3A$i$, the management entity 12 acts in a step 25 to add each of the nodes 3A$i$ to the groups G1 and Gf. Thereafter, in a step 26, the management entity 12 estimates the power PC1 and the SINR that would be received by the target entity 2 if the nodes 3 of the group Gf (i.e. the nodes 3A) were to transmit a training sequence SA2 that had been pre-equalized by their respective focusing filters Fi(t), with the transmissions taking place synchronously and simultaneously.

Thereafter, in a step 27, the management entity 12 compares the power PC1 with the maximum transmission power PC of the target entity, and the SINR with a threshold SINRmax. If PC1>PC and if SINR<SINRmax, that means that the nodes 3 of the group Gf transmitting the training sequence SA2 as pre-equalized by their respective focusing filters Fi(t) in synchronous and simultaneous manner would correspond to a transmission from the target entity 2 but of greater range than the range of the target entity 2.

Under such circumstances, in a step 28, the management entity 12 sends a message M3 to each of the nodes 3A$i$ of the group G1 telling it to perform a step 29. In response to receiving the message M3, each node 3A$i$ transmits over the wireless connection a training signal SA2 as pre-equalized by its own focusing filter Fi(t) and including a training sequence that is likewise written SA2. Simultaneously, each node 3$i$ of the group Gmax, not including the group G1, i.e. the nodes 3B and 3C listen in a step 30 to the training signal SA2. The transmission of the training signal SA2 and the listening thereto correspond to the stage AA of the frame 13.

Thereafter, in step 31, each node 3B$i$ and 3C$i$ verifies whether it has received the training signal SA2 correctly. For example, each node 3B$i$ and 3C$i$ determines the SINR of the received signal and compares it with a predetermined reception threshold S.

Since the test in step 27 was true, the transmission range of the training signal SA2 is greater than the transmission range of the training signal SA1. The nodes 3B situated at an intermediate distance from the target entity 2 determine that they have correctly received the training sequence SA2 and they perform the step 32. However, the nodes 3C that are further still from the target entity 2 determine that they have not correctly received the training sequence SA2 and they no longer contribute to the remainder of the communication.

In step 32, each node 3B$i$ estimates the impulse response Hi(t) of the transmission channel between the target entity 12 and itself as a function of the training signal SA2 that it has received as deformed by the channel. Each node 3B$i$ also calculates a focusing filter Fi(t) as a function of its impulse response Hi(t). The node 3B$i$ also sends a message M4 to the management entity 12 in order to indicate that it has received the training sequence SA2 correctly.

In response to receiving messages M4 from each node 3B$i$, the management entity 12 acts in a step 33 to add each of the nodes 3B$i$ in the groups G2 and Gf. Thereafter, in a step 34, the management entity 12 sends a message M5 including data to be transmitted to each node 3$i$ of the group Gf, i.e. to the nodes 3A and 3B, but not to the nodes 3C.

In a step 35, in response to receiving the message M5, each node 3A$i$ and 3B$i$ determines a pre-equalization filter Mi(t) referred to as a "transmission" filter. The transmission filter Mi(t) may be the previously determined focusing filter Fi(t), or it may be some other filter determined as a function of the impulse response Hi(t). In a variant, the transmission filter Mi(t) of a node 3$i$ is determined as a function of the impulse response Hi(t) of the node 3$i$ itself and of the impulse responses Hj(t) of the other nodes 3$j$.

Thereafter, each node 3A$i$ and 3B$i$ transmits the received data in a message M5 while pre-equalizing it with the transmission filter Mi(t), and they do so in simultaneous and synchronous manner. Data transmission corresponds to the stage D of the frame 13.

Thus, in a step 36, the target entity 2 receives the data of the message M5 in a transmission signal generated not only by the nodes 3A that are within its range, but also by the nodes 3B that are not within its range. The power and the SINR of the received signal are thus higher, thereby enabling transmission to take place at a faster rate.

The communications method performed by a node 3 comprises the steps 22, 23, 24, 29, 30, 31, 32, and 35. The communications method has a training step in the meaning of the invention that includes the steps 22, 23, and 24 for a node 3A or the steps 22, 23, 30, and 32 for a node 3B. The management method performed by the management entity 12 comprises the steps 20, 25, 26, 27, 28, 33, and 34.

If the test of step 27 is not true, that means that the transmission range of the training signal SA2 by the nodes 3A is not any greater than the transmission range of the training signal SA1 by the target entity 2. In other words, it is not possible to reach additional nodes 3. Under such circumstances, after step 27, the management entity 12 does not perform step 28. The nodes 3A do not receive the message M3 and therefore no longer perform step 29.

Thereafter, in steps 35 and 36, it is only the nodes 3A that participate in transmitting data. Thus, if it is not possible to reach nodes 3 other than those within range of the target entity 2, e.g. because of a particular arrangement of the nodes 3, the step 27 serves to save the energy that would otherwise be needed for transmitting the training signal SA2.

The invention is described above with reference to a particular implementation. There follow descriptions of several variant implementations, using the same references to designate elements that are identical or similar. These variants may be combined.

Figure 5:
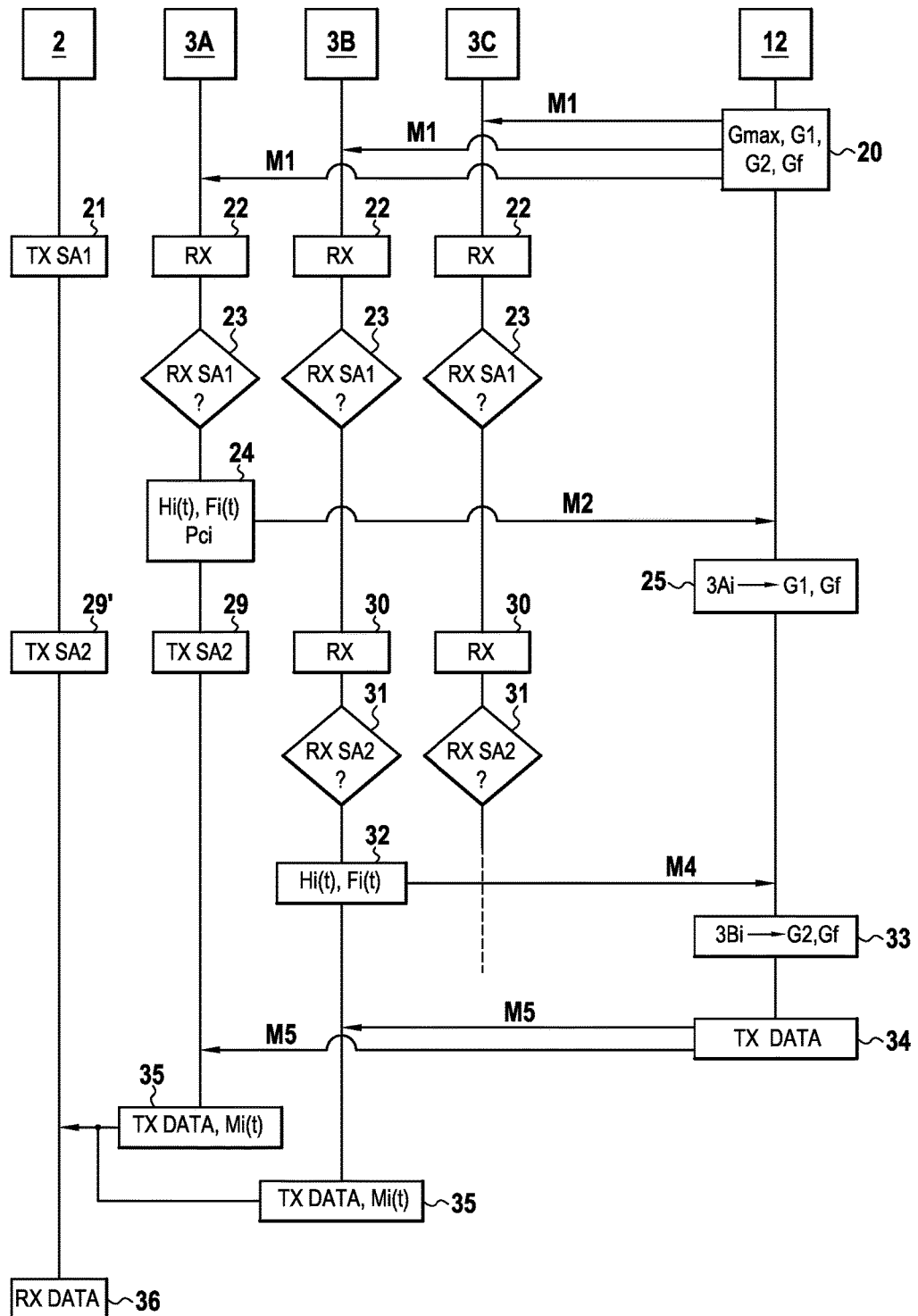
FIG. 5 is a diagram showing how a communication progresses in the FIG. 1 network, in a variant implementation.

FIG. 5 shows a variant in which the target entity 2 participates in transmitting the training signal SA2 during a step 29' in simultaneous or synchronized manner with the signal SA2 being transmitted by the nodes 3A in step 29. Under such circumstances, the message M2 sent to the management entity 12 indicates that the node 3Ai has received the training sequence SA1 correctly, but it must not indicate the power Pci. Furthermore, the steps 26, 27, and 28 are omitted and all of the nodes 3A perform the step 29 without waiting to receive a message M3. Since the target entity 2 and the nodes 3A co-operate in transmitting the training signal SA2, the range of the training signal SA2 is necessarily greater than the range of the target entity 2 on its own. It is therefore normally possible to reach additional nodes 3, and the step 27 is not necessary.

Figure 6:
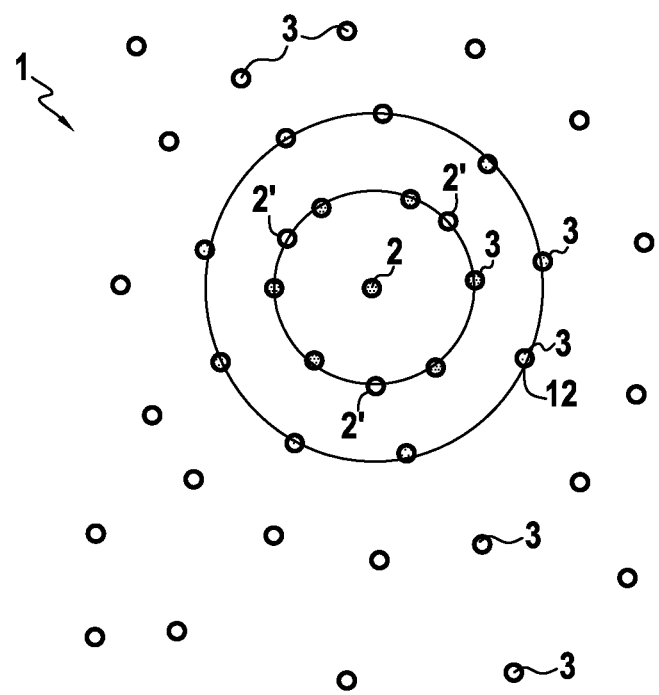
FIG. 6 is a diagram of a network in another implementation of the invention.
Figure 7:
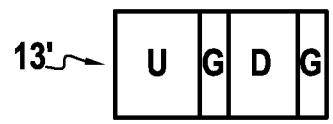
FIG. 7 shows a frame format used by the nodes of the FIG. 6 network.
Figure 8:
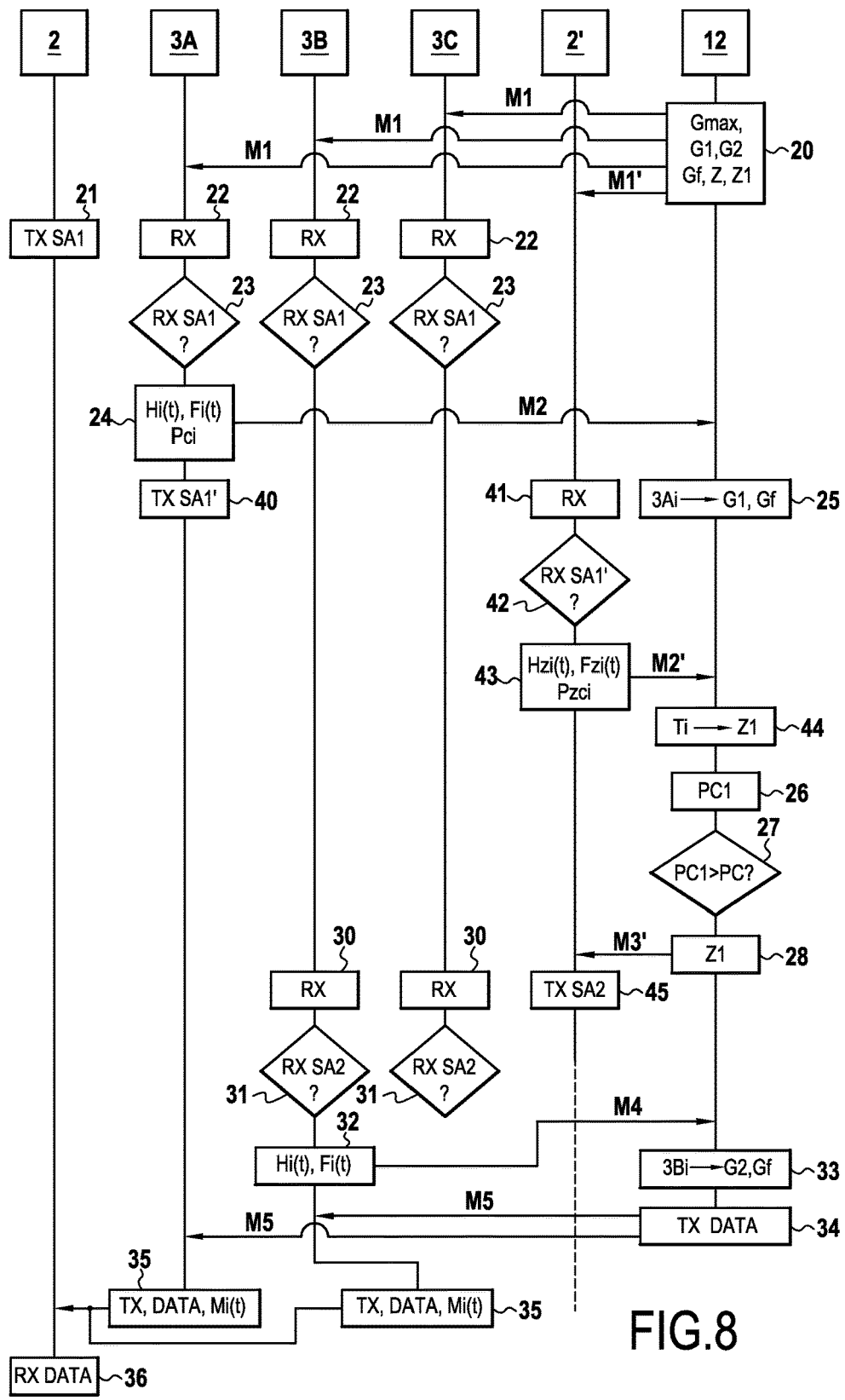
FIG. 8 is a diagram showing how a communication progresses in the FIG. 6 network.

With reference to FIGS. 6 to 8, there follows a description of an implementation in which training involves terminals 2' of the network 1. Thus, FIG. 6 shows the network 1 having a plurality of terminals 2'. The terminals 2' may present the same hardware structure as the communications device 4 of FIG. 2. In an access network, the terminals 2' may for example be pieces of telecommunications equipment similar to the target entity 2. FIG. 7 shows the format of a frame 13' used for communicating over a wireless connection in the network 1 of FIG. 6. Compared with the frame 13 of FIG. 3, the frame 13' likewise has an up transmission stage U and a down transmission stage D that are separated by a guard time G, but it does not have an internode transmission stage AA for transmission between nodes 3.

FIG. 8 shows how a communication progresses in the network 1 of FIG. 6. The description below relates more particularly to the steps that differ from those described with reference to FIG. 4.

In step 20, the management entity 12 defines a group Gmax of nodes 3 and informs the nodes 3 that they are included in Gmax by means of messages M1. The management entity 12 also initializes the groups G1, G2, and Gf with empty sets. Furthermore, the management entity defines a group Z of terminals 2' and informs the terminals 2' that they are included in Z by means of message M1'. The management entity 12 also initializes a group Z1 with an empty set.

Communication continues by steps 21 to 25 that are identical to those described with reference to FIG. 4.

After step 24, each node 3Ai acts in a step 40 to transmit a training signal SA1' over a wireless connection, which training signal has been pre-equalized by its focusing filter Fi(t) and includes a training sequence (likewise written SA1') that has been pre-equalized by the focusing filter Fi(t) as determined in step 24. Simultaneously, each terminal 2' of the group Z acts in a step 41 by listening to the training signal SA1'. The transmission of the training signal SA1' corresponds to the stage D in the frame 13'.

Thereafter, in a step 42, each terminal 2' of the group Z verifies whether it has correctly received the training signal SA1'. Those terminals 2' that have not received the training signal SA1' correctly no longer participate in the remainder of the communication. Those terminals 2' that have received the training signal SA1' correctly then participate in the remainder of the communication by performing steps 43 and 45 as described below.

In step 43, each terminal 2' estimates the impulse response Hzi(t) of the transmission channel between the target entity 2 and itself as a function of the received training sequence SA1' as deformed by the channel. Each terminal 2' calculates a focusing pre-equalization filter Fzi(t) as a function of its impulse response Hzi(t). The terminal 2' also estimates the power Pzci that it estimates it can deliver to the focus of the target entity 2 as a function of the impulse response Hzi(t). Finally, the terminal 2' sends a message M2' to the management entity 12 in order to indicate that it has correctly received the training sequence SA1' and in order to inform the management entity 12 about the power Pzci.

In response to receiving messages M2' from the various terminals 2i', the management entity 12 acts in a step 44 to add the terminals 2i' to the group Z1. Thereafter, in step 26, the management entity 12 estimates the power PC1 that would be received by the target entity 2 if the terminals 2' of the group Z1 were to transmit a training sequence SA2 as pre-equalized by their respective focusing filters Fzi(t) in synchronous and simultaneous manner.

Thereafter, in step 27, the management entity 12 compares the power PC1 with the maximum transmission power PC of the target entity. If PC1>PC, that means that the terminals 2' of the group Z1 transmitting the training sequence SA2 as pre-equalized by their respective focusing filters Fzi(t) in synchronous and simultaneous manner corresponds to a transmission from the target entity 2 but of range that is greater than the range of the target entity 2.

Under such circumstances, in step 28, the management entity 12 sends a message M3' to each terminal 2' of the group Z1 telling it to perform the step 45. In response to receiving the message M3', the terminal 2' sends a training signal SA2 over the wireless connection, which signal SA2 includes a training sequence, also written SA2. Simultaneously, each node 3 of the group Gmax, not including G1, i.e. the nodes 3B and 3C, acts in the step 30 to listen to the training signal SA2. The transmission of the training signal SA2 corresponds to the stage U of the frame 13'.

The communication continues with steps 31 to 36 that are identical or similar to those described with reference to FIG. 4.

In the implementation described with reference to FIGS. 6 to 8, the training signal SA2 that enables the number of co-operating nodes to be enlarged is transmitted by the terminals 2' and not by the nodes 3A as in the implementation of FIG. 4 (step 29). This implementation thus makes it possible to make better use of a conventional TDD frame format, i.e. without an internode transmission stage AA between the nodes 3.

In a variant that is not shown, the target entity 2 transmits a signal SA2 simultaneously to the terminals 2'. Under such circumstances, and in a manner similar to FIG. 5, the message M2 must not indicate the power Pci, the message M2' must not indicate the power Pzci, and the steps 26 and 27 can be optimized.

The description above relates to transmitting a first training signal followed by transmitting a second training signal, thereby enabling data to be transmitted to the target entity 2 by the nodes 3A that are in range, and also by the nodes 3B that are not in range. The same principle can be repeated in iterative manner, i.e. the nodes 3A and 3B may transmit a training signal SA3 enabling nodes 3 that are even further from the target entity 2 to participate in data transmission.

The above description relates to a communications device 4 corresponding to a node 3 and having an interface 11 that enables it to perform communication over a wired connection with the management entity 12. In a variant, communication between the management entity 12 and the nodes 3 is wireless communication (except for the nodes 3, if any, that acts as the management entity 12). Under such circumstances, the group Gmax cannot be defined arbitrarily amongst all of the nodes 3 of the network 1. On the contrary, the management entity 12 defines a group Gmax of nodes 3 that are within its range, e.g. by transmitting a beacon signal and listening for the responses of the nodes 3 that have received the beacon signal correctly. The nodes 3 that co-operate for transmitting data to the target entity 2 are then the nodes 3 situated in the range of the management entity 12 and in the "enlarged" range of the target entity 2. The term "enlarged range" of the target entity 2 is used to mean the range of the training signal SA2.

The description above relates to a communications device 4 having an antenna 10 and corresponding to a node 3 of the network 1 or to the target entity 2. In a variant, the communications device 4 corresponding to the target entity 2 has N antennas (N>1) and the communications device 4 corresponding to a node 3i has mi antennas (mi>1). Under such circumstances, the impulse response Hi(t) of size N×mi is a matrix of impulse responses of the multiple input-multiple output (MIMO) channel.

The above description relates to a communications device 4 having an antenna 10 and corresponding to a node 3 of the network 1. In a variant, the communications device 4 has a plurality of directional antennas 10 and can therefore transmit over a plurality of lobes. Under such circumstances, each lobe of a communications device 4 corresponds to a respective node 3. Thus, the above-described communications method is performed independently for each lobe of the communications device 4. The nodes 3 that transmit data to the target entity 2 then correspond to the lobes pointing towards the target entity 2, thereby enabling transmission power to be used efficiently.

Figure 4:
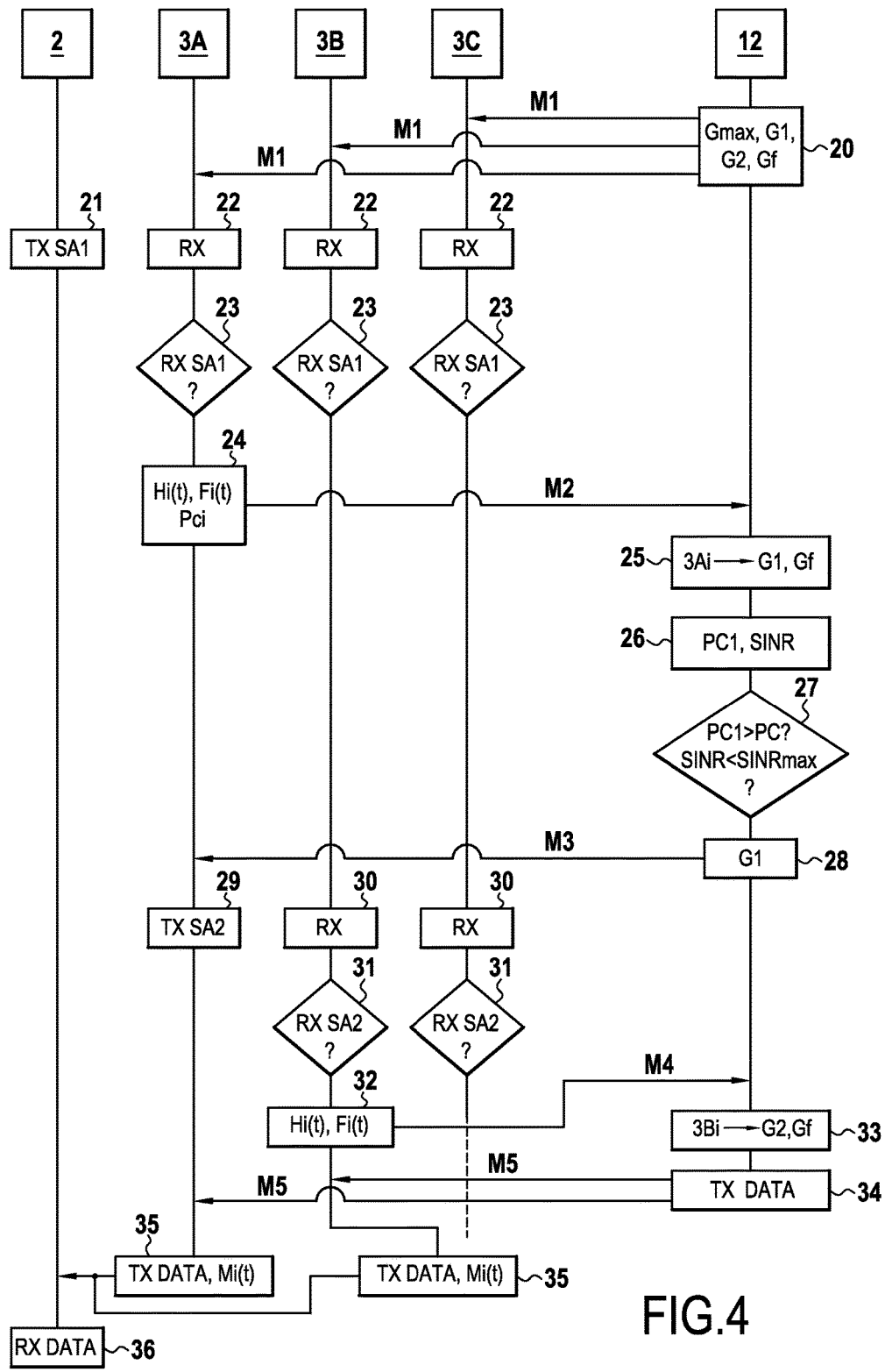
FIG. 4 is a flow chart showing how a communication progresses in the FIG. 1 network.

With reference to FIG. 4, the description relates to transmitting identical data to the nodes 3 (step 34, messages M5) and from the nodes 3 to the target entity 2 (steps 35 and 36). Nevertheless, from one node 3 to another, the data may be different or it may be encoded differently.

The invention claimed is:

1. A communications method executed by a node of a telecommunications network, the method comprising:
   a training step including determining a "transmission" filter as a function of a received training signal; and
   a data transmission step of transmitting data to a target entity of the network while using said transmission filter as determined during the training step;
   wherein the training step comprises:
   a listening step of listening to a first training signal coming from the target entity of the network;
   a verification step of verifying correct reception of the first training signal; and
   in response to correct reception of the first training signal:
      a step of determining the transmission filter as a function of at least the first training signal; and
      a step of transmitting an intermediary training signal or a second training signal pre-equalized by a "focusing" pre-equalization filter that is determined as a function of the first training signal; or
   in the absence of correct reception of the first training signal, a step of listening for a second training signal, and in response to correctly receiving said second training signal, a step of determining the transmission filter as a function at least of the second training signal.

2. The communications method according to claim 1, comprising in response to correct reception of the first training signal, a step of sending an information message to a management entity.

3. The communications method according to claim 2, wherein the information message gives an estimate of a power that can be achieved at the target entity, said step of sending a second training signal being performed in response to receiving an instruction message from the management entity.

4. A non-transitory computer program product comprising instructions for executing the steps of the method according to claim 1, when said program is executed by a computer.

5. A non-transitory computer readable medium readable by a computer and comprising instructions of the computer program according to claim 4.

6. A communications node for a telecommunications network, the node comprising:
   training means suitable for determining a "transmission" filter as a function of a received training signal; and
   data transmission means for transmitting data to a target entity of the network, while using said transmission filter determined by the training means;
   wherein the training means comprise:
   means for listening to a first training signal coming from the target entity of the network;
   means for verifying that the first training signal has been received correctly;
   means for determining the transmission filter as a function at least of the first training signal, and means for transmitting an intermediary training signal or a second training signal pre-equalized by a "focusing" pre-equalizing filter as determined as a function of the first training signal and activated in response to correctly receiving the first training signal; and
   means for listening to a second training signal and means for determining the transmission filter as a function at least of the second training signal, which means are activated in the absence of the first training signal being received correctly and in response to said second training signal being received correctly.

7. A telecommunications network comprising a target entity and a plurality of communications nodes according to claim 6, wherein the data transmission means of the communications nodes are suitable for transmitting data to the target entity in simultaneous and synchronous manner.

8. The telecommunications network according to claim 7, comprising a management entity, wherein the communications nodes comprise:
   power estimation means for estimating a power that can be achieved at the target entity, and message sender means for sending a message containing said power to the management entity and activated in response to correctly receiving the first training signal; and
   means for transmitting a second training signal and activated in response to receiving an instruction message from the management entity;
   the management entity comprising:
   receiver means for receiving said messages containing the powers that can be achieved at the target entity as transmitted by a group of communications nodes that have correctly received the first training signal;

test means for testing an enlargement condition as a function of said powers; and sender means for sending instruction messages to the communications nodes of said group and activated when said enlargement condition is true.

9. The telecommunications network according to claim 7, wherein:

the communications nodes include transmitter means for transmitting a second training signal, which means are activated in response to correctly receiving the first training signal; and the target entity includes transmitter means for transmitting a second training signal suitable for sending said second training signal in simultaneous and synchronous manner to the communications nodes.

10. The telecommunications network according to claim 7, further comprising at least one terminal wherein:

the communications nodes include transmitter means for transmitting an intermediate training signal, which means are activated in response to correctly receiving the first training signal; and the terminal includes listener means for listening to the intermediate training signal and transmitter means for transmitting a second training signal.

11. A management entity for a telecommunications network, the entity comprising:

receiver means for receiving messages containing powers that can be achieved at the target entity, which messages are transmitted by a group of communications nodes that have correctly received a first training signal;

test means for testing an enlargement condition as a function of said powers; and sender means, activated when said enlargement condition is true, for sending to the communications nodes of said group instruction messages instructing the communications nodes of said group to transmit a second training signal.

12. A management method performed by a management entity of a telecommunications network, the method comprising:

a step of receiving messages containing powers that can be achieved at a target entity as transmitted by a group of communications nodes that have correctly received a first training signal;

a step of testing an enlargement condition as a function of said powers; and when said enlargement condition is true, a step of sending to the communications nodes of said group instruction messages instructing the communications nodes of said group to transmit a second training signal.

13. A non-transitory computer program product comprising instructions for executing the steps of the method according to claim 12, when said program is executed by a computer.

* * * * *